(12) United States Patent
Mochizuki

(10) Patent No.: US 11,198,470 B2
(45) Date of Patent: Dec. 14, 2021

(54) OPERATION DEVICE

(71) Applicant: Leona Mochizuki, Shizuoka (JP)

(72) Inventor: Leona Mochizuki, Shizuoka (JP)

( * ) Notice: Subject to any disclaimer, the term of this patent is extended or adjusted under 35 U.S.C. 154(b) by 10 days.

(21) Appl. No.: 16/476,651

(22) PCT Filed: Jan. 12, 2018

(86) PCT No.: PCT/JP2018/000733
§ 371 (c)(1),
(2) Date: Nov. 27, 2019

(87) PCT Pub. No.: WO2018/131695
PCT Pub. Date: Jul. 19, 2018

(65) Prior Publication Data
US 2020/0079424 A1    Mar. 12, 2020

(30) Foreign Application Priority Data

Jan. 12, 2017 (JP) .............................. JP2017-003737
Apr. 27, 2017 (JP) .............................. JP2017-089014

(51) Int. Cl.
*B62D 6/00* (2006.01)
*B62D 6/04* (2006.01)

(52) U.S. Cl.
CPC ...................... *B62D 6/04* (2013.01)

(58) Field of Classification Search
USPC ........................................ 701/23, 36, 41–44
See application file for complete search history.

(56) References Cited

U.S. PATENT DOCUMENTS

| | | | | |
|---|---|---|---|---|
| 7,726,439 | B2 * | 6/2010 | Akuta | B62D 6/02 180/444 |
| 9,481,393 | B1 * | 11/2016 | Meyerhoffer | F16D 48/06 |
| 2003/0200016 | A1 * | 10/2003 | Spillane | B60W 10/11 701/36 |
| 2005/0145433 | A1 * | 7/2005 | Akuta | B62D 5/003 180/443 |
| 2005/0236223 | A1 * | 10/2005 | Yokota | B62D 5/046 180/446 |
| 2009/0030574 | A1 * | 1/2009 | Yamakado | B62D 6/00 701/44 |

(Continued)

FOREIGN PATENT DOCUMENTS

| | | | |
|---|---|---|---|
| JP | 2001039325 A | 2/2001 | |
| JP | 2002308134 A | 10/2002 | |

(Continued)

OTHER PUBLICATIONS

English Translation of the Written Opinion of the International Searching Authority of PCT/JP2018/000733.
Translation of the ISR of PCT/JP2018/000733.

*Primary Examiner* — Jonathan L Sample
(74) *Attorney, Agent, or Firm* — Taro Yaguchi

(57) ABSTRACT

A manipulating apparatus for facilitating continuously holding a manipulating unit that is under automatic manipulation is provided. Controlling the movement of the manipulating unit under automatic manipulation facilitates continuously holding the manipulating unit during automatic manipulation, and furthermore, the movement of the manipulating unit enables grasping the state of the manipulation object under automatic manipulation and intervention in manipulation under automatic manipulation.

5 Claims, 10 Drawing Sheets

(56) References Cited

U.S. PATENT DOCUMENTS

| | | | | |
|---|---|---|---|---|
| 2013/0151074 A1* | 6/2013 | Takeuchi | ............... | B60W 50/06 |
| | | | | 701/37 |
| 2013/0261894 A1* | 10/2013 | Kojima | ................ | B62D 5/0484 |
| | | | | 701/41 |
| 2014/0311814 A1* | 10/2014 | Morselli | ............... | A01B 69/008 |
| | | | | 180/167 |
| 2015/0336587 A1* | 11/2015 | Inoue | ................. | B62D 15/0285 |
| | | | | 701/41 |
| 2016/0107679 A1* | 4/2016 | Kimura | ................ | B62D 5/0463 |
| | | | | 701/42 |
| 2016/0362136 A1* | 12/2016 | Oya | ......................... | B60R 1/00 |
| 2017/0008557 A1* | 1/2017 | Mitsumoto | ............ | B62D 3/126 |
| 2017/0021862 A1* | 1/2017 | Akatsuka | ............ | B60W 40/08 |
| 2017/0057544 A1* | 3/2017 | Matsuno | ............. | B62D 15/021 |
| 2017/0066476 A1* | 3/2017 | Kudo | ................. | B62D 5/0463 |
| 2017/0088174 A1* | 3/2017 | Inoue | ................. | B60T 8/17557 |
| 2017/0174257 A1* | 6/2017 | During | ............... | B62D 15/0285 |
| 2017/0282961 A1* | 10/2017 | Teranishi | ................. | E02F 9/24 |

FOREIGN PATENT DOCUMENTS

| | | | |
|---|---|---|---|
| JP | 2004034751 | A | 2/2004 |
| JP | 2015016814 | A | 1/2015 |
| JP | 2015137085 | A | 7/2015 |
| JP | 2015147547 | A | 8/2015 |
| JP | 2015229399 | A | 12/2015 |
| JP | 2016074356 | A | 5/2016 |
| JP | 3204508 | U | 6/2016 |
| JP | 2016159781 | A | 9/2016 |
| JP | 6027292 | B1 | 11/2016 |
| WO | 2016194862 | A1 | 12/2016 |

* cited by examiner

OPERATION DEVICE

FIELD OF THE INVENTION

The invention according to the present application relates to a manipulating apparatus for facilitating continuously holding a manipulating unit which is under automatic manipulation.

BACKGROUND OF THE INVENTION

In recent years, railway vehicles and automobiles, which are conventionally manipulated by humans, are automatically manipulated, thanks to advanced artificial intelligence. These automated machines survey the outside world with a sensor or another means to take action based on its own judgment.

However, human intervention is desirable in an emergency where these automated machines cannot make appropriate judgment.

In particular, it is desired from a viewpoint of the liability of an accident, for example, that a driver places the hands on the steering wheel during automatic driving of a vehicle.

Nevertheless, keeping the hands constantly placed on the steering wheel throughout the automatic driving is harder than holding the steering wheel constantly.

On the other hand, continuously holding the steering wheel is difficult during the automatic driving because the steering wheel turns a great deal at a curve, for example.

Patent Document 1 makes it possible to hold the steering wheel promptly in an emergency by providing a handrest on a steering wheel to alleviate fatigue on the hands; however, it is difficult to grasp the condition of the steering wheel instantly and maintain proper driving when having to grab the steering wheel again in a moment.

Patent Document 1: Utility Model Registration No. 3204508

SUMMARY OF THE INVENTION

The invention of the present application provides a manipulating apparatus for controlling the movement of a manipulating unit such as a steering wheel, while the manipulating unit is under automatic manipulation, to facilitate holding the manipulating unit even during the automatic manipulation; and further enables grasping a state of a manipulation object under automatic manipulation based on the movement of the manipulating unit.

A manipulating apparatus for manipulating a manipulation object value, comprising a manipulating unit, a second manipulating unit, and the manipulation object value, the manipulating apparatus having an interlocked state and a non-interlocked state as controlled states, characterized in that the interlocked state is that the manipulation object value is determined in response to both or either of the state and movement of the manipulating unit, and that the manipulating unit moves in response to a variation of the manipulation object value caused by a factor other than the manipulating unit, as necessary, or a state in which normal manipulation is being executed by the manipulating unit; and the non-interlocked state is a state in which the manipulation object value is determined by the second manipulating unit, and the state of the manipulating unit is determined in response to that value and a variation of the manipulation object value caused by a factor other than the second manipulating unit as necessary.

The movement of the manipulating unit in the non-interlocked state is equal to or smaller than that in the interlocked state, with respect to the same manipulation object value.

A range of movement of the manipulating unit is set for the interlocked and non-interlocked states, respectively, and the manipulating unit is moved to the maximum or minimum of the aforementioned range of movement when the aforementioned manipulation object value is at the maximum or minimum.

Alternatively, the aforementioned manipulating unit is not moved in response to the aforementioned manipulation object value in the non-interlocked state.

One or more sensory indicative ranges are set as ranges of the manipulation object value; and an indication is provided in response to the aforementioned manipulation object value when the aforementioned manipulation object value is within the aforementioned sensory indicative ranges.

The aforementioned indication means is any combination of display of a moving image, movement of the manipulating unit, sound, and electrical stimulation.

The state of the manipulating unit is shifted to a state which is under the controlled state of a switchover destination determined by a manipulation object value when switching over between the aforementioned interlocked state and non-interlocked state, at which time a maximum load is set, and the manipulating unit is moved to be in the aforementioned predetermined state in a case where a load applied to the manipulating unit by manipulation of the manipulating unit is at or less than the aforementioned maximum load; and the aforementioned manipulation object value is varied toward a value determined by the aforementioned state of the manipulating unit in a case where the load applied to the manipulating unit by the manipulation of the manipulating unit is at or exceeds the aforementioned maximum load.

In a case where the manipulating unit is not in a predetermined state corresponding to a manipulation object value in the aforementioned controlled state of a switchover destination when the non-interlocked state and the interlocked state are switched over, correction is made to the behavior between the aforementioned manipulating unit and the aforementioned manipulation object value in the aforementioned controlled state of the switchover destination so that the manipulation object value in the aforementioned controlled state of the switchover destination matches the current value based on the current state of the manipulating unit.

When the non-interlocked state and the interlocked state are switched over, manipulation is executed by the aforementioned second manipulating unit until the aforementioned switchover of the controlled states is completed, during which the manipulation of the aforementioned second manipulating unit can be intervened in response to the manipulation of the aforementioned manipulating unit, as necessary.

At lease a means for indicating the aforementioned manipulation object value in the non-interlocked state is provided.

In an aspect of the invention according to the present application, the manipulating apparatus is a steering apparatus;
the manipulation object value is an amount of steering;
the manipulating unit is a steering wheel;

the second manipulating unit is manipulated by a system for automatically manipulating the amount of steering;
a state of the manipulating unit is an amount of turning the steering wheel; and
manipulation of the manipulating unit is turning the steering wheel.

In another aspect of the invention according to the present application,
the manipulating apparatus is a lever;
the manipulating unit is a handle part of the lever;
a state of the manipulating unit is a position of the aforementioned handle part; and
manipulation of the manipulating unit is moving the aforementioned handle part.

A manipulating apparatus comprising any combination of two or more manipulating apparatuses having the aforementioned characteristics is provided.

Where a state of a manipulating unit is A, a target state of the manipulating unit corresponding to a manipulation object value is B, and an amount representing the difference between A and B is x, the manipulating apparatus sets x to a predetermined value by varying A so as to reduce x gradually, or by varying B in a case where variation of A is impeded that x cannot be a target value at the moment.

For example, when a predetermined value x is to decrease at a constant rate, the rate at which x decreases is maintained to be constant by varying A and B as described above. At that time, the manipulating unit approaches the state B at the aforementioned constant rate of variation if no load is applied to the manipulating unit; and B approaches A by varying the manipulation object value when the manipulating unit is fixed in place so that A does not vary.

The aforementioned target state B of the manipulating unit corresponding to a manipulation object value may be deemed a state of a second manipulating unit.

A manipulating apparatus comprising a manipulation object value, a first manipulating means, and a second manipulating means,
the manipulating apparatus having a first controlled state and a second controlled state as controlled states, characterized in that
the first controlled state is a state in which normal operation is being performed by the first manipulating mans;
the second controlled state is that the aforementioned first manipulating means is controlled in response to an arbitrary correspondence of the aforementioned state of the first manipulating means with respect to the aforementioned second manipulating means or the aforementioned manipulation object value; and
a plurality of the aforementioned second manipulating manes may exist, and a plurality of the aforementioned second controlled states may exist.

The aforementioned arbitrary correspondence is an arbitrary correspondence which outputs the aforementioned state of the first manipulating means as at least the aforementioned manipulation object value or the aforementioned second manipulating means is inputted.

The aforementioned arbitrary correspondence can be expressed by an arbitrary function formed from any combination of an arbitrary linear line and an arbitrary curve.

Movement of the first manipulating means is restricted when the first manipulating means transitions toward a target state.

The state of the first manipulating means is not to be varied rapidly when the state of the first manipulating means is varied so as to match a predetermined target state. The state of the first manipulating means is varied smoothly in response to the variation of the target state even when the target state varies rapidly.

The state of the first manipulating means may be controlled in response to a predicted target state when the aforementioned variation of the target state of the first manipulating state is predictable.

Provided according to the invention of the present application is a manipulating apparatus for controlling the movement of a manipulating unit such as a steering wheel, while the manipulating unit is under automatic manipulation, to facilitate holding the manipulating unit even during the automatic manipulation, the manipulating apparatus being also capable of grasping a state of a manipulation object under automatic manipulation based on the movement of the manipulating unit.

DETAILED DESCRIPTION OF THE INVENTION

A summary of systems of manipulating apparatuses according to the present application will be described below.

The systems comprise a manipulating unit, a second manipulating unit, and a manipulation object value.

Figure 1:
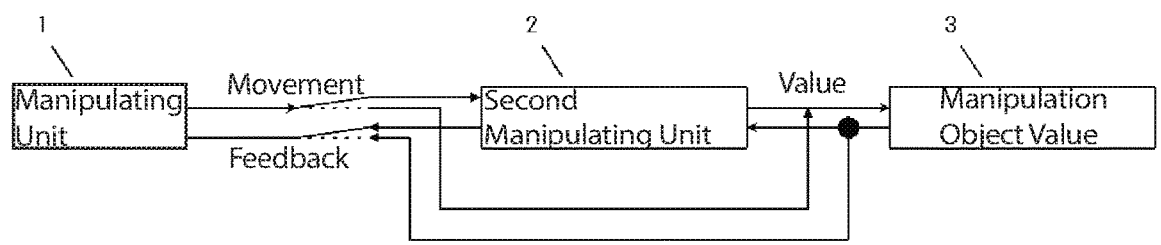
FIG. 1 is a system configuration example 1.

A system of FIG. 1 will be described.

Movement of a manipulating unit (1) is converted into a numerical value for determining a manipulation object value (3) in an interlocked state.

Additionally, a variation of the manipulation object value (3) due to external factors may be fed back as movement of the manipulating unit (1).

The interlocked state may correspond to the functions of an existing manipulating apparatus to which the features of the manipulating apparatus according to the present application is applied. At that time, an existing manipulating unit may be considered as a second manipulating unit (2). In application, a new manipulating unit may be prepared as the manipulating unit (1) or the second manipulating unit (2).

The state and movement of the second manipulating unit (2) determines the manipulation object value (3) in a non-interlocked state. Further, the state and movement of the second manipulating unit (2) determines the state and movement of the manipulating unit (1).

The second manipulating unit (2) may be an internal state of the system.

The second manipulating unit (2) may be manipulated by a system which automatically manipulates the manipulation object value (3).

Figure 2:
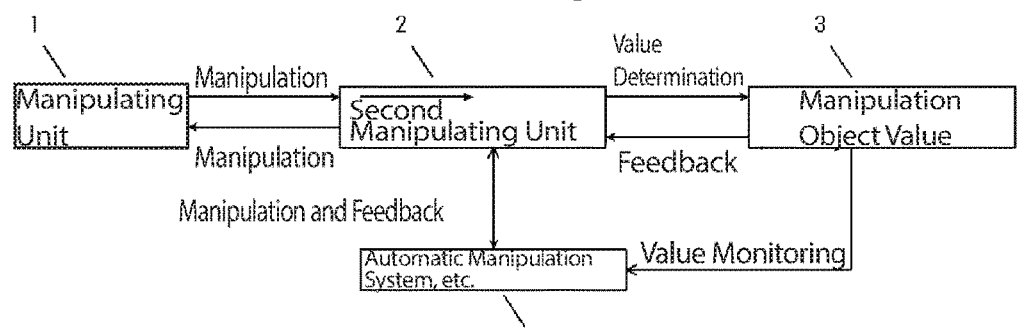
FIG. 2 is a system configuration example 2.
Figure 3:
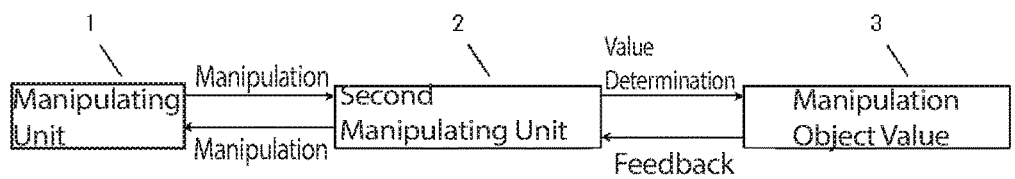
FIG. 3 is a system configuration example 2.

FIGS. 2 and 3 show another example of a configuration of the system according to the present application.

In the system of FIGS. 2 and 3, the manipulation object value (1) is manipulated by the second manipulating unit (2) in both interlocked and non-interlocked states.

At that time, it is assumed that the second manipulating unit (2) functions in the same way as the original manipulating unit of an existing manipulating apparatus to which the system according to the present application is applied when it is applied. In application, the original manipulating unit may be implemented as a virtual second manipulating unit (2). The second manipulating unit (2) may be implemented as a real device.

Movement of the manipulating unit (1) corresponds to movement of the second manipulating unit (2) in the interlocked state. That is, manipulating the manipulating unit (1) manipulates the manipulation object value (3) through the second manipulating unit (2). Also, in the system of FIGS. 2 and 3, varying the manipulation object value (3) means varying the second manipulating unit (2); and varying the second manipulating unit (2) means varying the manipulation object value (3).

Further, variation of the manipulation object value (3) due to external factors is conveyed to the manipulating unit (1) through the second manipulating unit (2).

The functions of the manipulating apparatus in the interlocked state may be deemed equivalent to the original functions of a system to which the manipulating apparatus according to the present application is applied. In other words, movement of the manipulating unit in the interlocked state performs the functions equivalent to those in a case in which movement of the manipulating unit is not controlled by the manipulating apparatus according to the present application.

Movement of the manipulating unit (1) in the non-interlocked state will be described next.

In the non-interlocked state, movement and a state of the manipulating unit (1) is controlled in response to movement and a state of the second manipulating unit (2).

Figure 4:
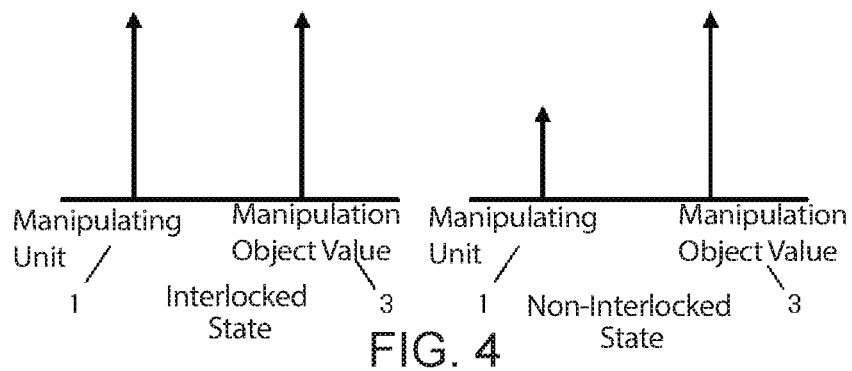
FIG. 4 is an operation example 1 of a manipulating unit and a manipulation object value.

As illustrated in FIG. 4, movement of the manipulating unit in the non-interlocked state is smaller than that in the interlocked state, with respect to the same manipulation object value.

Figure 7:
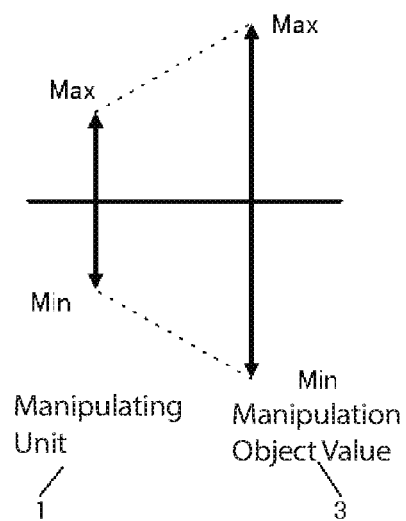
FIG. 7 is a correspondence example 3 of a state of a manipulating unit and a manipulation object value.

More specifically, the maximum and minimum states of the manipulating unit and the maximum and minimum manipulation object values are set as illustrated in FIG. 7; and movement of the manipulating unit is adjusted such that the manipulating unit is in the maximum state when the manipulation object value is at maximum, and the manipulating unit is in the minimum state when the manipulation object value is at minimum.

Figure 5:
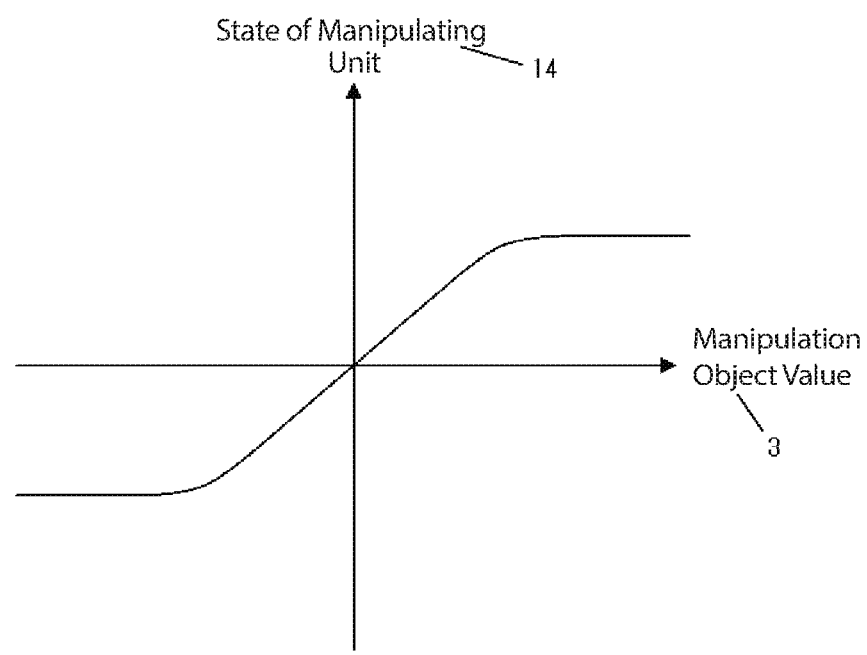
FIG. 5 is a correspondence example 1 of a state of a manipulating unit and a manipulation object value.
Figure 6:
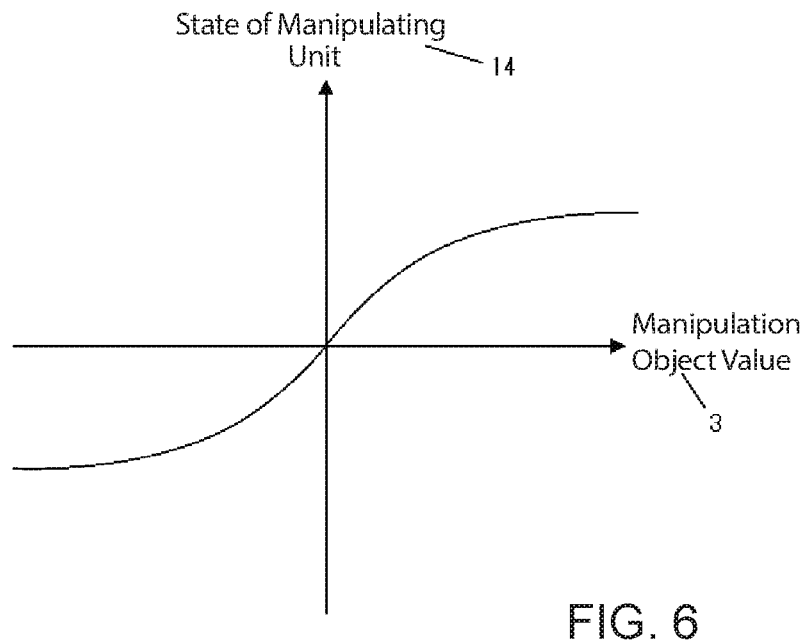
FIG. 6 is a correspondence example 2 of a state of a manipulating unit and a manipulation object value.

Alternatively, a relationship between a state of the manipulating unit (14) and a manipulation object value (3) as illustrated in FIG. 5 is established. As illustrated in FIGS. 5 and 6, the relationship between the movement of a manipulating unit and the manipulation object value does not have to be proportional. The relationship may be proportional. The relationship may also include an inflection point.

The relationship between the state of the manipulating unit (14) and the manipulation object value (3) may vary according to a state of the manipulating apparatus or external factors, as necessary.

The manipulating unit (1) does not otherwise move in the non-interlocked state regardless of the manipulation object value (3).

An indication is provided to the operator in response to a value of the manipulation object value (3).

One or more sensory indicative ranges are established as ranges of the manipulation object value (3); and an indication is provided in response to the aforementioned manipulation object value when a value is within the aforementioned ranges.

Figure 8:
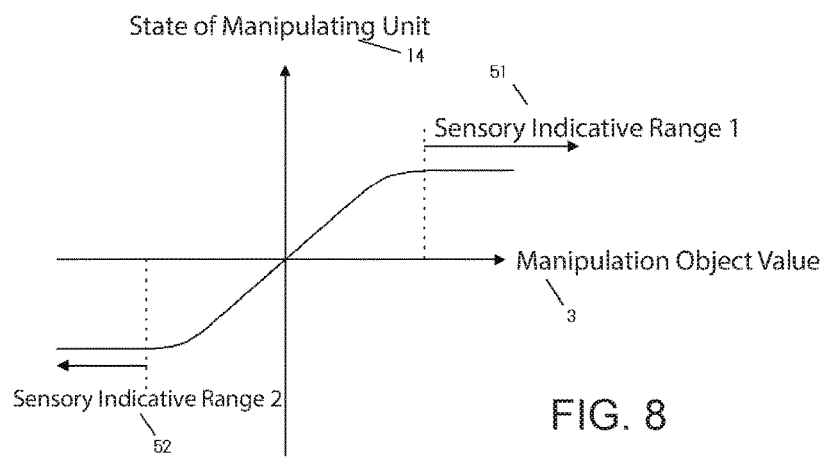
FIG. 8 is an example of setting a sensory indicative range.

For example, the manipulating unit in FIG. 8 is controlled so as not to move within sensory ranges (51, 52) when the sensory ranges (51, 52) are established as illustrated in FIG. 8; however, the manipulating unit (1) in a state at that time vibrates with a magnitude corresponding to the manipulation object value (3), for example, to cause the operator to sense the current apparatus target value when the manipulation object value (3) is within the range 1 (51) or the range 2 (52).

The current value of the manipulation object value (3) can be thereby detected even when the manipulating unit (1) of the manipulating apparatus according to the present application makes little or no movement.

The method described above is one example, and other indication means include display of characters or moving images, sound, and tactile sensory stimulus; and any means may be used as long as the means causes the operator to sense the indication. Additionally, the manipulating unit (1) may move within the sensory range although the manipulating unit (1) does not move in the example in FIG. 8.

Operation of switching over between the interlocked state and the non-interlocked state will be described below.

The state of the manipulating unit (1) is gradually shifted to a state of the manipulating unit (1) which is determined by the controlled state of a switchover destination when the states of the manipulating unit (1) to be determined in the respective controlled states of the interlocked state and the non-interlocked state differ from each other while switching over between the two states; and intervention in the manipulation by the operator, if any, is reflected in the state of the manipulating unit (1) as required in the meanwhile.

Figure 9:
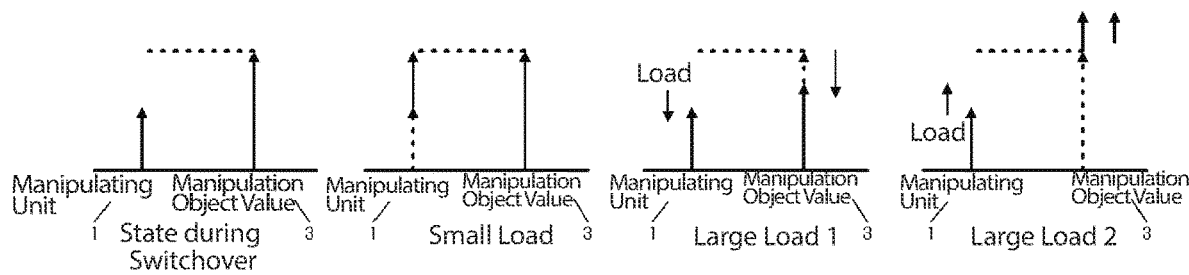
FIG. 9 is an example 1 of switchover operation between controlled states.

When switching over between the aforementioned interlocked state and the non-interlock state, the state of the manipulating unit (1) is shifted so as to be in a state which is in the controlled state of the switchover destination determined by the manipulation object value (3), at which time a maximum load is set, and the manipulating unit (1) is shifted to the aforementioned predetermined state when a load applied to the manipulating unit (1) by manipulating the manipulating unit (1) is at or less than the maximum load (a small load of FIG. 9); and the manipulation object value (3) is varied toward a value determined by the aforementioned state of the manipulating unit (1) when the load applied to the manipulating unit (1) by manipulating the manipulating unit (1) is at or exceeds the maximum load (a large load 1 or a large load 2 in FIG. 9). FIG. 9 illustrates the operation.

Figure 11:
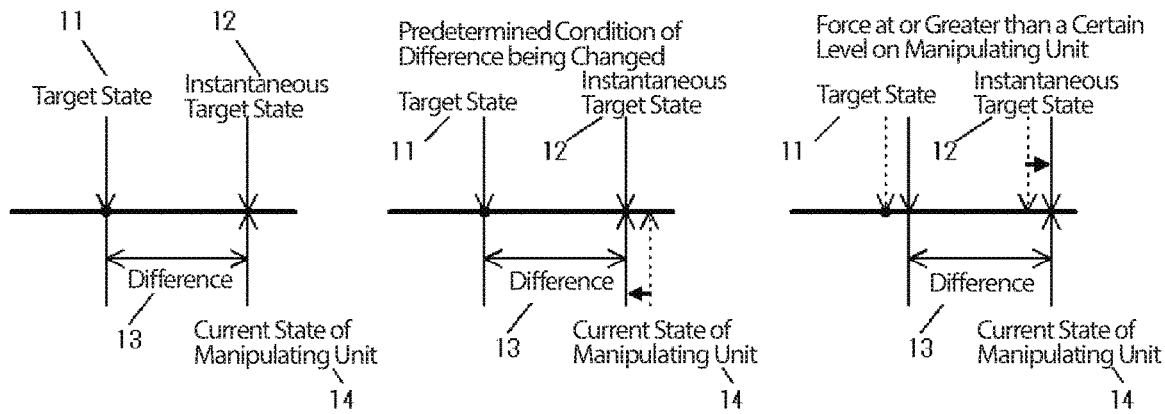
FIG. 11 is an explanatory drawing of the switchover operation 1 between controlled states.

An embodiment is explained using the model of FIG. 11 as an example. A target state (11) is a state of the manipulating unit (1) determined by the controlled state of a switchover destination.

An instantaneous target state (12) is a target state of the manipulating unit (1) at a moment, which is based on the target state (11) as a reference. A difference (13) is the difference between the target state (11) and the state of the manipulating unit (14); and the manipulating unit is ultimately matched with the target state (11) by varying a predetermined condition of the difference (13), such as gradually reducing the difference (13), which in turn varies the instantaneous target state (12).

The manipulating apparatus according to the present application controls the manipulating unit (1) such that the difference (13) between the target state (11) and the instantaneous target state (12) satisfies the predetermined condition while conveying the movement and variation between the manipulating unit (1) and the manipulation object value (3) as well as the second manipulating unit (2) to each other.

Additionally, the state of the manipulating unit (14) is varied to the target state (11) by varying the predetermined condition of the difference (13) between the target state (11) and the instantaneous target state (12) of the manipulating unit (1), which completes the switchover.

In the process of the switchover, the manipulating unit (1) is moved such that the state of the manipulating unit (14) matches the instantaneous target state (12). This is achieved through tracking control on the instantaneous target state (12) by means of PID control.

In the process of the switchover, the instantaneous target state (12) is varied such that the difference (13) between the target state (11) and the instantaneous target state (12) (the state of the manipulating unit (14)) matches the predetermined condition. Thus, the instantaneous target state (12) shifts such that the difference (13) matches the predetermined condition when the manipulation object value (3) and the second manipulating unit (2) vary.

That is, the manipulating unit (1) and the manipulation object value (3) are control such that the difference (13) varies only by the predetermined condition in the process of the switchover.

In the process of the switchover, the manipulating unit (1), the manipulation object value (3), and the second manipulating unit (2) are moved by varying the predetermined condition of the difference (13) in order to match the state of the manipulating unit (14) with the target state (11), in combination with aforementioned control.

Varying the predetermined condition of the difference (13) means reducing the difference (13) over time, for example, thereby the manipulating unit (1) approaches the target state (11) over time.

The difference between the state of the manipulating unit (14) and the target state (13) as the switchover begins is set as an initial value of the difference (13).

As an example of operation during the switchover, the instantaneous target state (12) varies in response to the variation of the manipulation object value (3) such that the difference (13) satisfies the predetermined condition as the manipulation object value (3) varies via the second manipulating unit (2) in the process of the switchover.

Likewise in the case of a change of the manipulation object value (3) due to an external factor being reflected in the manipulating unit (1), the target state (11) and the instantaneous target state (12) is changed in response to the change of the manipulation object value (3), which is reflected in the movement of the manipulating unit (1).

In the process of switchover, force equal to or greater than force arbitrarily set is applied to the manipulating unit (1) is conveyed as change in the manipulation object value (3) proportional to the magnitude of the force.

The manipulation object value (3), and the second manipulating unit (2) as necessary, will change in response to force exerted on the manipulating unit (1) in the direction away from the instantaneous target state (11) when such force is exerted.

Alternatively, the state of the manipulating unit (14) changes in response to force exerted on the manipulating unit (1) in the direction away from the instantaneous target state (11) when such force is exerted; which in turn changes the manipulation object value (3), and the state of the second manipulating unit (2) as necessary.

In the process of switchover, manipulation performed by the operator through the manipulating unit (1) can be thereby reflected in the manipulation object value (3) even when the manipulating unit (1) is moving so as to be in a state determined by the controlled state of the switchover destination.

One example of the operation is that the manipulation object value (3) changes instead when the operator exerts force to hinder movement of the manipulating unit (1) while the manipulating unit (1) is moving toward the target state (11) in the process of the switchover, and the target state (11) thereby approaches the state of the manipulating unit (14).

The manipulating unit (1) and the manipulation object value (3) respectively move in response to force when the force is at or greater than a certain level yet not great enough to stop or hinder movement of the manipulating unit (1). At that time, how the manipulating unit (1) and the manipulation object value (3) move in response to the force may be set arbitrarily.

Further, the difference (13) satisfies the predetermined condition by changing the manipulation object value (3) such that the instantaneous target (12) matchers the target state (11) that approaches the state of the manipulating unit (14) when force is applied in the direction toward the target state (11) to move the manipulating unit (1) as well.

The operation during the transition from the interlocked state to the non-interlocked state is such that when the state of the manipulating unit (14) is in a certain state, a reference state, regardless of the manipulation object value (3) in the non-interlocked state, for example, the target state (11) becomes the aforementioned reference state; the difference between the reference state and the state of the manipulating unit (14) at the time of switchover is set as an initial difference (13); and the state of the manipulating unit (14) matches the target state (11) in the same fashion as the foregoing.

Alternative operation of switchover between the interlocked state and the non-interlocked state will be described below.

Correction is made such that the current state of the manipulating unit (1) matches a state of the manipulating unit (1) in the controlled state of a switchover destination when the states of the manipulating unit (1) to be determined in the respective controlled states of the interlocked state and the non-interlocked state differ from each other while switching over between the two states.

In one example, the state of the manipulating unit (1) is an amount of variation from a reference; and this reference is changed such that the manipulation object value (3) takes the current value according to the state of the manipulating unit (1) during the switchover, in the controlled state of a switchover destination when the manipulation object value (3) is determined in response to the amount of variation of the manipulating unit (1).

Figure 13:
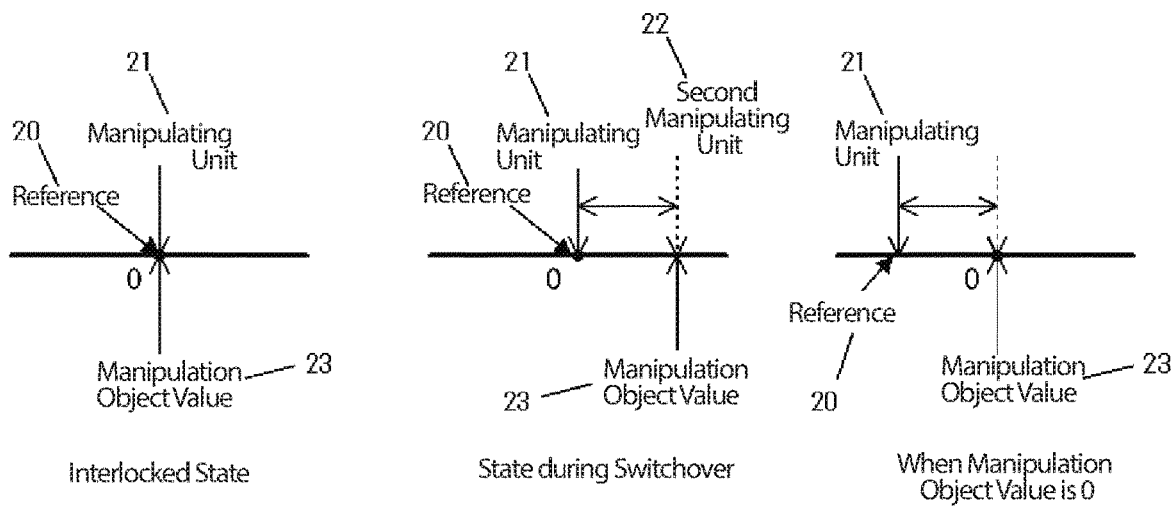
FIG. 13 is an explanatory drawing 2 of the switchover operation 2 between controlled states.

A case as illustrated in FIG. 13 will be explained as an example. When the state of the manipulating unit (21) is expressed in a numerical value and the manipulation object value (23) is a numerical value, the manipulation object value (23) is determined by an amount of variation of the manipulating unit (21) whose reference (20) is zero. The manipulating unit (21) and the manipulation object value (23) match in the interlocked state (the interlocked state of FIG. 13). The reference (20) is changed such that the current manipulation object value (23) is determined by the current value of the manipulating unit (21) (the state during a switchover of FIG. 13) when the state is switched over from the non-interlocked state to the interlocked state as the manipulating unit (21) does not match the manipulation object value (23) after transitioning to the non-interlocked state (the state during a switchover state of FIG. 13). At that time, the value of the manipulating unit (21) does not become zero even if the manipulation object value (23) becomes zero (when the manipulation object value becomes zero of FIG. 13).

Intervention in manipulation by the manipulating unit (1) in the non-interlocked state will be explained.

A predetermined manipulation of the manipulating unit (1) in the non-interlocked state is conveyed to inside and outside of the system of the manipulating apparatus as a signal.

For example, in an automatic driving vehicle, a signal corresponding to turning a steering wheel toward right is conveyed to an automatic driving system by doing so, and the vehicle moves to a lane on the right.

The non-interlocked state transitions to the interlocked state when the manipulating unit is manipulated at a predetermined speed and force, and a specific condition is met as required.

The predetermined value, manipulation, and condition may be set arbitrarily according to a system to which the manipulating apparatus is applied.

A device for sensing whether the operator is holding the manipulating unit is provided to the manipulating unit (1), and conveys to outside the manipulating apparatus system that the holding cannot be detected for a certain period of time when such is the case. For example, a warning is issued when the automatic manipulating system senses that the holding by the operator cannot be detected; and suspension of the automatic manipulation is attempted after ensuring the safety when the holding still cannot be detected.

Two or more manipulating apparatuses according to the present application may be combined.

For example, in a manipulating apparatus whose movement in x and y directions is deemed the movement of the manipulating unit (1), such as a joystick, the movement in x and y directions is controlled respectively with corresponding manipulating apparatuses according to the present application.

Different types of manipulating apparatuses, such as a throttle lever and a steering wheel, may be combined.

An example of a steering system in an automatic driving vehicle is presented. A manipulating apparatus according to the present application is applied to a steering system of an automatic driving vehicle in the example.

This example comprises a steering wheel as the manipulating unit (1) and an internal state indicative of an amount of manipulating a steering gear as the second manipulating unit (2), and the manipulation object value (3) is an amount of steering.

The interlocked state of a system according to the present application corresponds to a state in which manual driving is being performed, and the non-interlocked state corresponds to a state which is under automatic driving.

The state of the manipulating unit (1) is how much the steering wheel has been turned with respect to the state of the steering wheel as a reference when the vehicle travels with manual driving in a straight line with zero amount of steering. Variation of the manipulating unit (1) means the steering wheel being turned.

This example of the system of the manipulating apparatus according to the present application will be explained based on a system configuration illustrated in FIG. 2.

That is, the steering wheel, the manipulating unit (1), manipulates the second manipulating unit (2) during manual driving. Further, the second manipulating unit (2) manipulates the amount of steering, the manipulation object value (3). The steering wheel, the manipulating unit (1), thereby manipulates the amount of steering, the manipulation object value (3), during manual driving.

The second manipulating unit during automatic driving is manipulated by a function of the automatic driving system for automatically manipulating the steering gear. Further, the movement of the steering wheel, the manipulating unit, is controlled in response to the state of the second manipulating unit. In this example, the second manipulating unit is an internal state of the automatic driving system manipulated by the function of the system for automatically manipulating the steering gear although the second manipulating unit may naturally be configured with a real device.

Here, the operation of the steering wheel during manual driving is the same as the original operation during manual driving before applying the manipulating apparatus according to the present application.

The steering wheel during automatic driving performs any movement of the manipulating unit (1) in the non-interlocked state described in the foregoing.

Switchover from manual driving to automatic driving will be described.

Switchover from manual driving to automatic driving is executed by a means determined by a vehicle comprising an automatic driving system, for example, pressing a button for switching over to automatic driving or the system of the vehicle sensing the driver experiencing difficulty driving.

The manipulating unit (1) transitions from a state of the manipulating unit corresponding to manual driving to a state of the manipulating unit corresponding to automatic driving.

The manipulating unit (1) at that time moves in any method of the switchover operations of the controlled states described in the foregoing.

Switchover from automatic driving to manual driving will be described.

The manipulating unit transitions from a state of the manipulating unit corresponding to automatic driving to a state of the manipulating unit corresponding to manual driving.

Switchover from automatic driving to manual driving could conceivably be due to an emergency; therefore, it is desirable that the driver can intervene in the manipulation even while the steering wheel is operating through the system of the manipulating apparatus as a result of the switchover.

That is, the switchover is executed by the foregoing method in which the manipulating unit (1) is controlled such that the difference (13) between the target state (11) and the instantaneous target state (12) satisfies a predetermined condition while the movement and variation between the manipulating unit (1) and the manipulation object value (3) as well as the second manipulating unit (2) are conveyed to each other.

Figure 10:
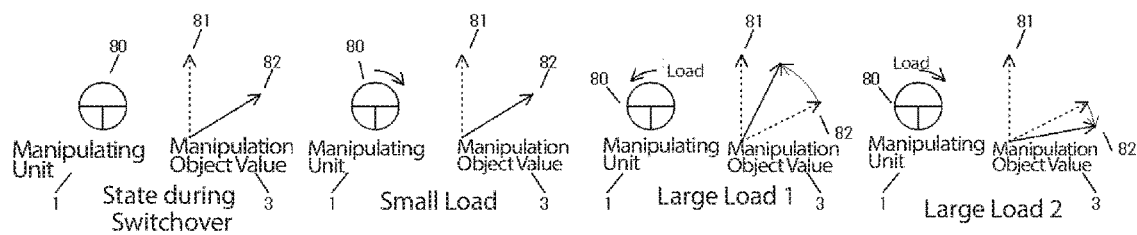
FIG. 10 is an example 2 of switchover operation between controlled states.

FIG. 10 shows operation of this example after applying the operation explained in the foregoing, referring to FIG. 11. The steering wheel (80) moves toward an amount of steering (82) when a load applied to the steering wheel (80) is at or less than a certain level as illustrated in the case of a small load in FIG. 10. The amount of steering (82) moves in the same direction as the load, i.e., toward the steering wheel (80) in the example of FIG. 10, when a load at or greater than a certain level is applied in the opposite direction from the movement of the steering wheel (80) as illustrated in the case of a large load 1 in FIG. 10. The amount of steering (82) moves in the same direction as the load when a load at or greater than a certain level is applied in the same direction as the movement of the steering wheel (80) as illustrated in the case of a large load 2 in FIG. 10.

That is, the difference between the current angle of the steering wheel and an angle of the steering wheel determined by the current amount of steering is progressively reduced such that the steering wheel will be at the angle of the steering wheel determined by the current amount of steering.

Alternatively, correction is made such that the current state of the steering wheel will be in the state of the switchover destination of the manipulating unit because swift completion of switchover is desirable.

Figure 12:
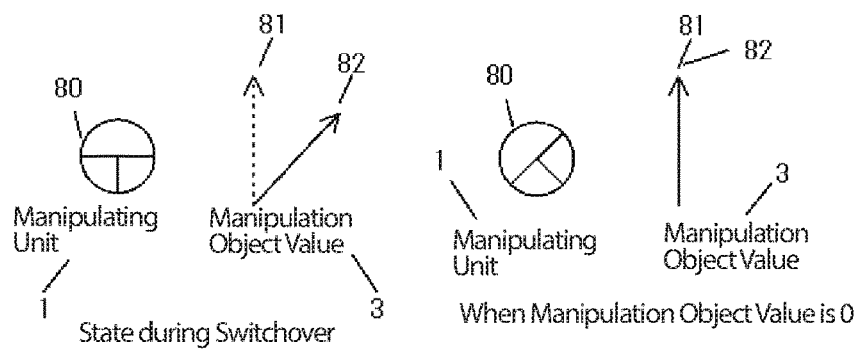
FIG. 12 is an explanatory drawing 1 of the switchover operation 2 between controlled states.

For example, as shown in FIG. 12, correction is made so that a steering gear is steered to the right while the steering wheel is set straight if a switchover to manual driving is executed when the steering gear is steered rightward while the steering wheel is set straight. At that time, the steering wheel needs to be turned to the left from the state at the moment in order to set the steering gear straight, and the state in which the steering wheel is turned to the left from the straight setup becomes a new reference state of the steering wheel.

The correction is desirably canceled after a user's manipulation or after a certain period of time.

It is desirable in canceling that the correction be canceled by the foregoing method in which the manipulating unit (1) is controlled such that the difference (13) between the target state (11) and the instantaneous target state (12) satisfies a predetermined condition while the movement and variation between the manipulating unit (1) and the manipulation object value (3) as well as the second manipulating unit (2) are conveyed to each other.

Further, it is desirable to send a notification that the correction is being made during the process.

Intervention in the control performed by automatic driving, that is intervened by manipulating the steering wheel during automatic driving, will be described.

Movement of the steering wheel is controlled by a manipulating apparatus system during automatic driving. At that time, the steering wheel being turned actively by the driver enables intervening in the controlled performed by automatic driving.

For example, the automatic driving system receives a signal from the manipulating apparatus system when the steering wheel is turned to the right against the control performed by the manipulating apparatus system during automatic driving, and attempts to change the driving lane to the right lane. In another case, an attempt is made to change a route determined by the automatic driving system to make a right turn at a location where a right turn was not originally planned.

Switchover from automatic driving to manual driving is executed when the steering wheel is turned with force equal to or greater than a predetermined strength, for example, when the driver turns the steering wheel to the right to avoid a danger in emergency.

Another example of applying the manipulating apparatus according to the present application is:

a manipulating apparatus, characterized in that
the manipulating apparatus is a lever;
the manipulating unit is a handle part of the lever;
the state of the manipulating unit is a position of said handle part or a state in which the lever is being manipulated; and
the manipulation of the manipulating unit is moving said handle part.

A manipulating apparatus comprising a manipulation object value, a first manipulating means, and a second manipulating means,
the manipulating apparatus having a first controlled state and a second controlled state as controlled states, characterized in that
said first controlled state is a state in which normal operation is being performed by said first manipulating means;
the second controlled state is a state in which the first manipulating means is controlled in response to an arbitrary correspondence of a state of said first manipulating means with respect to said second manipulating means or said manipulation object value; and
a plurality of said second manipulating means may exist, and a plurality of said second controlled states may exist.

For example, a state of said first manipulating means is determined in a second controlled state 1 in response to a second manipulating means 1; a state of said first manipulating means is determined in a second controlled state 2 in response to a second manipulating means 2; and a state of said first manipulating means is determined in a second controlled state 3 through a different process from said second controlled state 1, in response to said second manipulating means 1. Also, a state of said first manipulating means may be determined in response to two or more second manipulating means.

The aforementioned arbitrary correspondence is an arbitrary correspondence which outputs a state of the aforementioned first manipulating means as at least the aforementioned manipulation object value or the aforementioned second manipulating means is inputted.

The aforementioned arbitrary correspondence can be expressed by an arbitrary function formed from a combination of an arbitrary linear line and an arbitrary curve.

The aforementioned arbitrary correspondence may vary in response to the factors when the state of the aforementioned first manipulating means is also outputted in response to one or more factors other than the aforementioned manipulation object value or the second manipulating means.

The aforementioned arbitrary correspondence is expressed by any combination of an area that the state of the first manipulating means varies linearly, non-linearly, or approximating an n-th order function in response to the aforementioned manipulation object value; an area that the state of the aforementioned first manipulating means does not vary in response to the aforementioned manipulation object value; and an area that the state of the aforementioned first manipulating means varies in multiple directions, discretely, or corresponding to a function which can be expressed with an arbitrary curve, in response to variation of the aforementioned manipulation object value in a certain direction.

The state of the first manipulating means varies in response to the aforementioned manipulation object value, and values of ratios of the variation are two or more types. However, a ratio of the variation being zero, i.e., a value of a ratio of the variation that the state of the first manipulating means does not vary in response to the aforementioned manipulation object value, does not have to be included in the number of the aforementioned types. It may be deemed that there are two or more types of ratio values of the aforementioned variation in a section where the ratio value of the variation gradually changes and presented as a curve in a graph.

Consideration may be limited to a ratio of the variation in a section which is linear or with a small curvature that can be approximated to a linear line. That is, a ratio value of a variation at a curved section, that connects the aforementioned sections which are linear or with a small curvature that can be approximated to a linear line, does not have to be included in the aforementioned number.

The same applies to a case where the aforementioned state of the first manipulating means is changed by other factors.

In the correspondence between the manipulation object value and the state of the first manipulating means, one implementation means is a state of the first manipulating means with respect to a manipulation object value, which is expressed by an arbitrary function.

Where a state of a first manipulating means is expressed as y and a manipulation object value as x, a correspondence f(x), which constitutes y=f(x), is established and controlled so as to be a state of the first manipulating means in response to f(x).

F(x) may be presented in any graph. A graph may be presented with any curves and linear lines.

Increase and decrease of a value indicative of a state of the first manipulating means with respect to variation of the manipulation object value in a certain direction may be switched. It means that an extreme value may be included when f(x) is presented in a graph.

Figure 14:
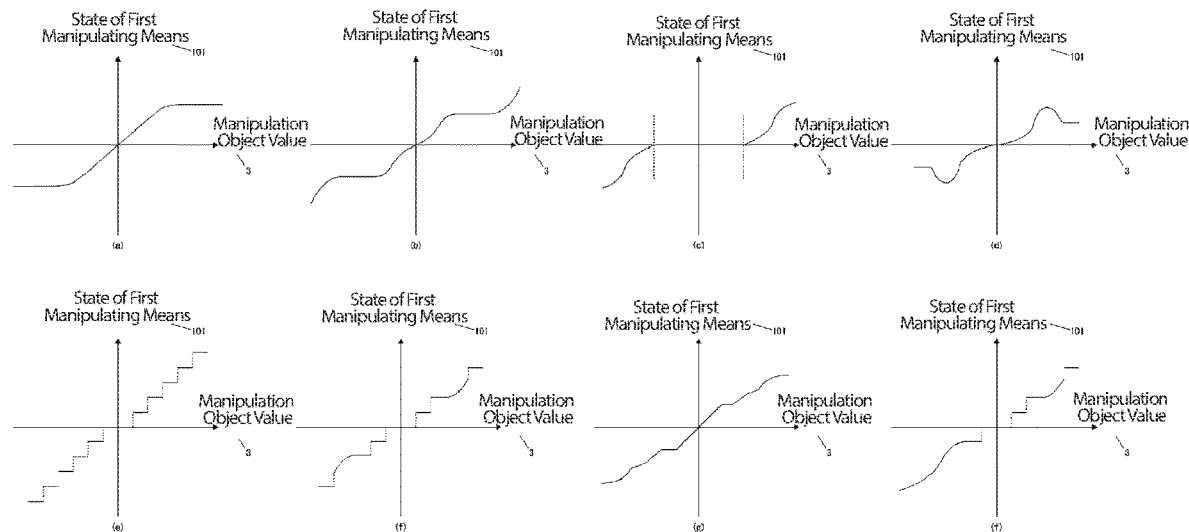
FIG. 14 is a correspondence example 1.

FIG. 14 shows examples of correspondence. The horizontal axis is the manipulation object value and the vertical axis is the state of the first manipulating means. The point of intersection of the axes may be deemed as the reference. Constant variation (FIG. 14a). The way of variation changes in mid-course (FIG. 14b). Variation begins at some point (FIG. 14c). The direction of variation reverses in mid-course (FIG. 14d). Variation occurs in stages. Variation is discontinuous (FIGS. 14e and 14f). The way of variation changes discontinuously (FIG. 14g). Variation is asymmetrical with respect to the reference (FIG. 14h). Any correspondence other than those shown in these examples may be employed.

The aforementioned correspondence may vary based on another factor. That is, the number of inputs to the aforementioned f(x) may be increased. The correspondence is established such as y=f(x, s) or y=f(x, s, s1, s2, ... ) when another factor is expressed as s, or multiple other factors as s1, s2, and so on. The aforementioned function f may be deemed a single-valued function.

The aforementioned correspondence can be presented as a face of an arbitrary three-dimensional graph when there is only one other factor. For example, a manipulation object value is in the horizontal direction, the s is in the vertical direction, and the state of the first manipulating means in the height direction.

It can be also said that the shape of the aforementioned graph f(x) varies based on the s. For example, the upper and lower limits of f(x) can be reduced and the way of variation may be relaxed when a vehicle speed is fast, where the manipulating apparatus is a vehicle steering wheel, the manipulation object value is a steering angle, and the s is a vehicle speed.

A factor s may be set arbitrarily. For example, a factor s may be a ratio of variation of the internal state or the manipulation object value of the manipulating apparatus, or may be a value corresponding to the internal state or process of an apparatus, machine, system, or the like to which the manipulating apparatus according to the present application is applied. Specific examples in the case of an automobile are a vehicle speed, the curvature of a curve, acceleration, a braking condition, a road surface condition, a traffic condition, and the like. Naturally, examples are not limited thereto.

A function expressing the correspondence may have the same output for different inputs. The function may include a range where the output does not vary, may change the direction of variation, or may vary discretely. Ratios of variation or change in tangential direction may be discontinuous. [The function] may be asymmetrical.

An alternative means for implementing the aforementioned correspondence determines a state of the first manipulating means by a process based on an arbitrary algorithm.

The way of variation of the first manipulating means may be changed corresponding to the direction of variation of the manipulation object value.

Figure 15:
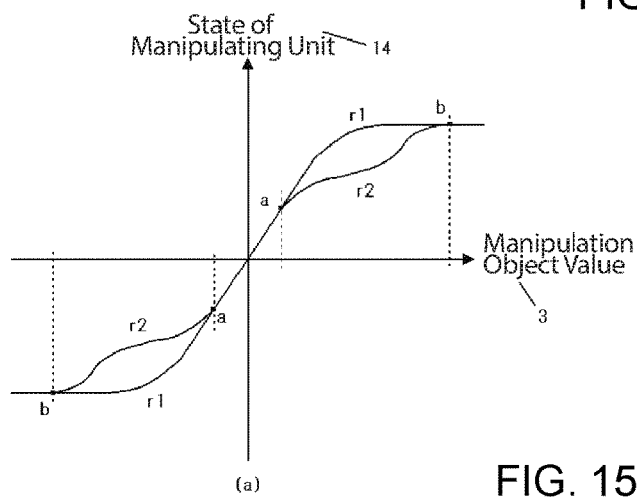
FIG. 15 is a correspondence example 2.

As FIG. 15 illustrates, the route of variation of the state of the first manipulating means may be changed corresponding to the direction of variation of an input value. In the example of FIG. 15, the route r1 is taken when the manipulation object value varies in the direction away from the reference value and crosses the point a; and the route b is taken when the manipulation object value varies in the direction toward the reference value and crosses the point b. The same applies to other types of inputs. The number of routes of variation of the aforementioned state is not limited, and which route is to be taken may be based on conditions other than how the manipulation object value varies. For example, any internal state of the system may be used to select the aforementioned route. Here, the reference value is a value on the axis of the graph.

Movement of the first manipulating means is restricted when the first manipulating means varies toward a target state.

The state of the first manipulating means is not to change rapidly when the state of the first manipulating means varies so as to match a predetermined target state. The state of the first manipulating means varies smoothly in response to variation of the target state even when the target state varies rapidly.

A sudden change of the state of the first manipulating means is thereby restrained, facilitating continued holding of the manipulating means by the operator.

In one example of the aforementioned restriction, a ratio of variation of the state of the first manipulating means, a ratio of variation of the ratio of the variation, or both are restricted.

A speed or acceleration of variation of the state of the first manipulating means or both are restricted.

The aforementioned restriction may be changed in response to the direction of variation of the target state or the state of the first manipulating means. For example, different restrictions may be set on variation of the state of the first manipulating means in the direction away from the reference value and in the direction toward the reference value, respectively. The aforementioned restriction may also be changed in response to the direction of variation of the ratio of the variation. For example, acceleration of variation of the state of the first manipulating means may be slow and deceleration thereof may be fast. Also, the aforementioned restriction may be changed in response to the manipulation object value or other internal states of the system. For example, the aforementioned restriction on the speed is more relaxed as the state of the first manipulating means is farther away from the reference value. That is, variation of the state of the first manipulating means may be early at a point far from the reference value. In one example relating to automobiles, the aforementioned restriction the speed becomes stricter as the vehicle speed increases so that the movement of the state of the first manipulating means becomes slower. Naturally, factors other than the vehicle speed as illustrated may be used.

The state of the first manipulating means may take the shortest route or track the variation of the target state (102) to match the target state.

Figure 16:
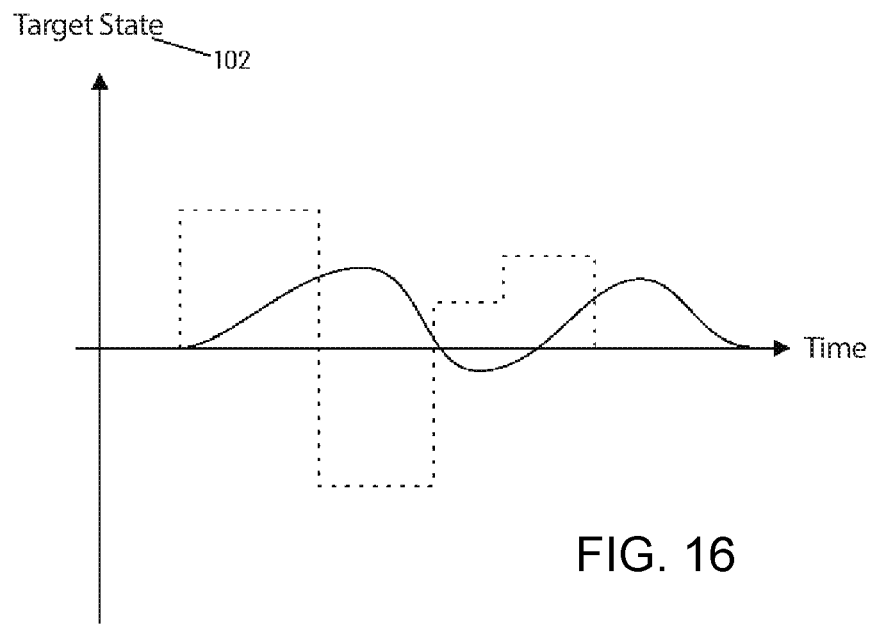
FIG. 16 is an operation example 1 of variation toward a target state.

Taking the shortest route means that the state of the first manipulating means varies toward the current target state (102). FIG. 16 shows an example of the operation. The dashed line indicates the target state and the solid line indicates temporal variation of the state of the first manipulating means.

Figure 17:
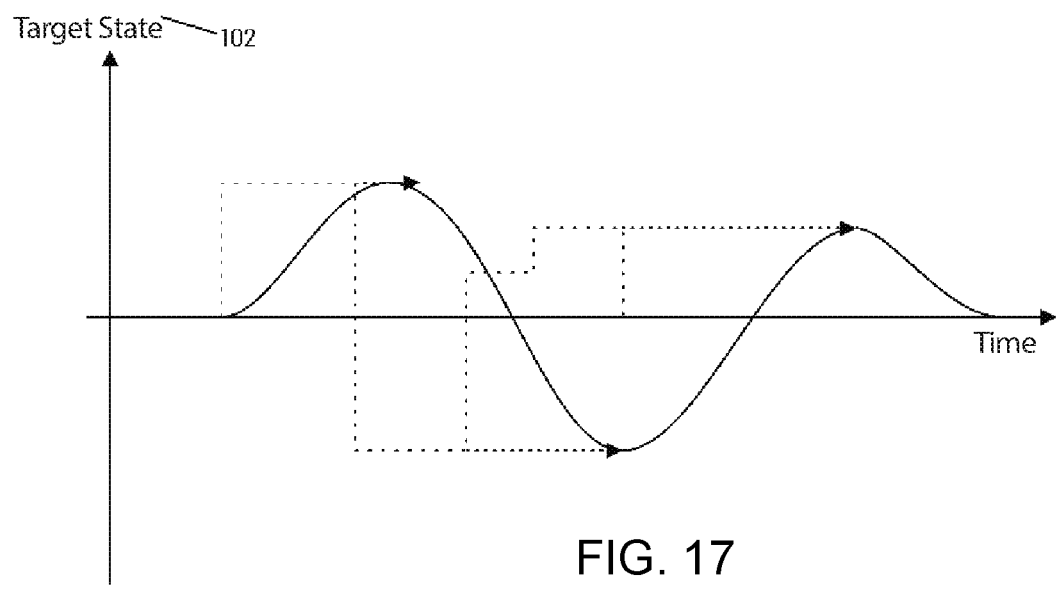
FIG. 17 is an operation example 2 of variation toward a target state.

In the case of tracking the variation, points of change in the direction of the variation of the target state (102) may be tracked. For example, extreme values are tracked in a graph of the variation of the target state. The state of the aforementioned first manipulating means varies toward the current target state when the aforementioned point of change or extreme value does not exist. FIG. 17 shows an example of the operation. The dashed line indicates the target state and the solid line indicates temporal variation of the state of the first manipulating means. Part or all of the points to be tracked may be ignored when there are a certain number of them or more. The target state varies discretely in FIGS. 16 and 17 for the purpose of explanation although the target state may vary smoothly, of course, and the variation of the first manipulating means may be assumed to match the variation of the target state as long as the original variation satisfies the aforementioned restrictions.

The state of the first manipulating means may vary in response to the variation of a predicted target state.

The state of the first manipulating means may be controlled in response to a predicted target state when the variation of the target state is predictable, for example, the target state is automatically controlled or the variation of the state of the first manipulating means delays with respect to the variation of the target state.

In one example of the operation, the state of the manipulating means is expressed by a numerical value, and the ratio of variation of the state of the manipulating means decreases as it approaches 100 and stops at the state of 100 when it is known that the target state varies aiming to be 100.

The state of the manipulating means varies toward a predicted target state ahead of the current state. At that time, the variation of the state of the manipulating means may be controlled such that the ratio of variation of the manipulating means approaches the ratio of variation of the target state.

The manipulating means is controlled such that when a predicted variation of the target state is presented in a graph, the variation of the state of the manipulating means is a fitted curve of the aforementioned graph that satisfies the aforementioned restrictions.

Figure 18:
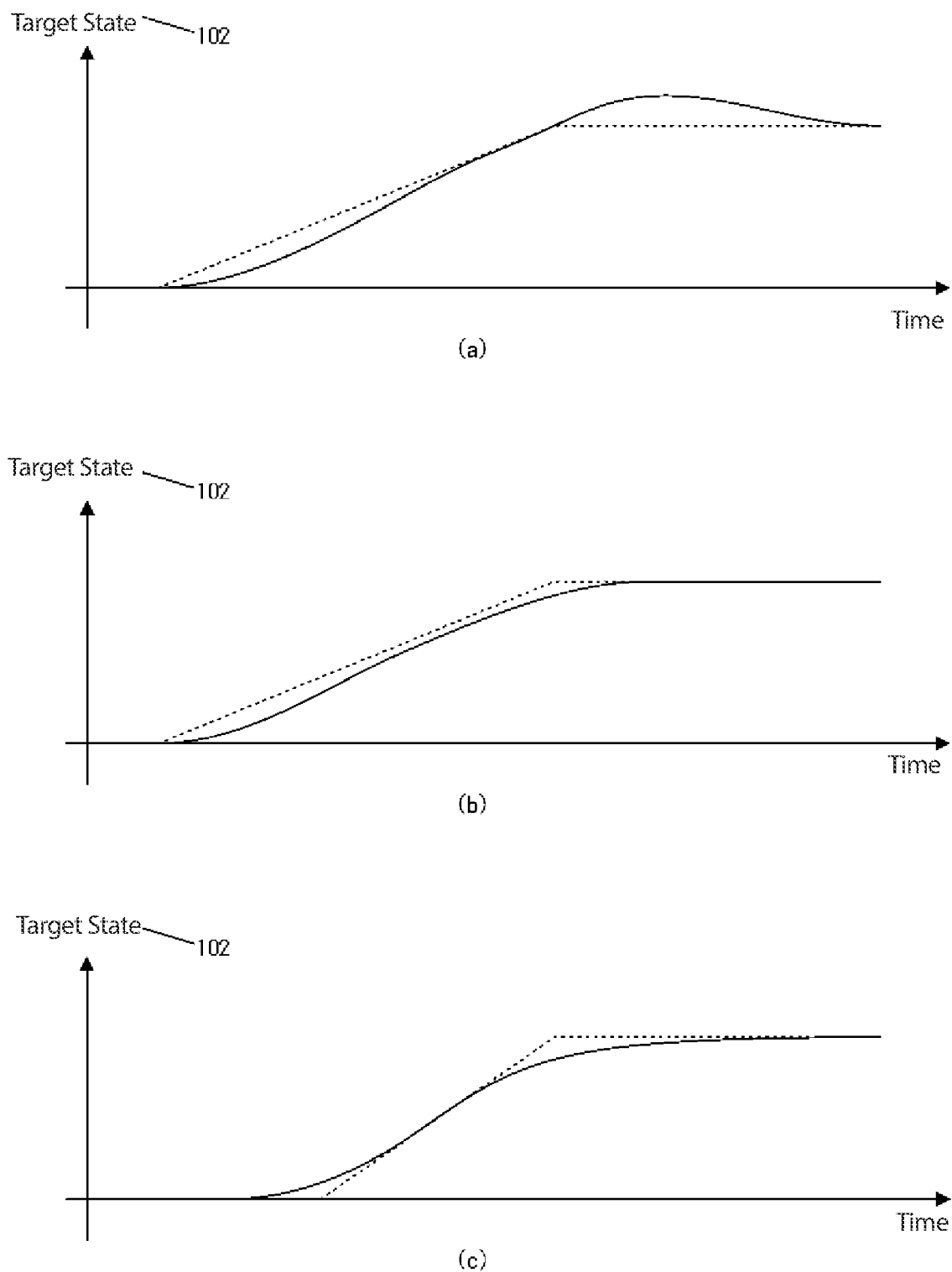
FIG. 18 is an operation example of a first manipulating means entailing prediction of a target state.

The aforementioned operation of prediction is executed at the beginning, end, or both of the variation of the target state. Also, whether to reflect or how to reflect the aforementioned prediction may be changed according to how the target state varies or according to any other factors. For example, the beginning of the variation of the target state is also reflected when the target state varies in the direction toward the reference value of the state of the manipulating means, but is not reflected in the variation in the direction away therefrom. FIG. 18 shows an example of the operation. The dashed lines indicate the target state and the solid lines indicate temporal variation of the state of the first manipulating means. There is a concern without the aforementioned prediction that variation of the state of the first manipulating means may delay with respect to sudden change of the target state or may overshoot the target state (e.g., FIG. 18(a)). Overshooting the target state is at least prevented by easing the variation taking a predicted target state into account (e.g., FIG. 18(b)). Also, variation of the target state in the direction away from the current state of the first manipulating means is predicted so that tracking the variation of the target state is facilitated by beginning to vary the first manipulating means sooner (e.g., FIG. 18(c)).

Here, the first manipulating means may be deemed to correspond to the aforementioned manipulating unit (1). The second manipulating means may be deemed to correspond to the aforementioned second manipulating unit (2).

States of the first manipulating means to be handled may be changed between the first controlled state and the second controlled state. For example, the state of the first manipulating means is expressed by a state indicative of an amount corresponding to a differential of displacement in the first controlled state, and by a state corresponding to displacement in the second controlled state. The same applies to other cases. For example, the manipulation object value is determined in response to the speed of the steering wheel in the first controlled state, and the turning angle of the steering wheel is determined in response to the manipulation object value in the second controlled state, where the manipulating means is a steering wheel.

How the manipulation object value varies in response to an amount of variation of the state of the manipulating means is changed according to arbitrary inputs when the manipulation object value varies in response to a state of the manipulating means.

An upper limit is set to a range in which the manipulation object value can vary according to the aforementioned arbitrary inputs. The manipulation object value will not vary even if the manipulating means is manipulated exceeding the aforementioned upper limit.

In an example of steering an automobile wherein the manipulating means is a steering wheel, the manipulation object value is an amount of steering, and the aforementioned arbitrary input is a vehicle speed, the faster the vehicle speed is, the lesser the variation of the amount of steering is with respect to an amount of manipulating the steering wheel.

In another example of operation, the faster the aforementioned vehicle speed is, the narrower the range is in which the amount of steering is allowed.

According to the above, an amount of steering, i.e., a degree of turning a traveling vehicle, is restricted in a state of a fast vehicle speed, thereby slipping is kept under control. A factor other than the vehicle speed may be used, such as the curvature of a curve, acceleration, a braking condition, a road surface condition, a traffic condition, and the like. Naturally, the factors are not limited thereto.

The amount of variation of the state of the manipulating unit may be controlled so as to keep it minimal or to omit a part of the variation process while the state of the manipulating unit varies toward a target state. As one example, operation in which the same state of the manipulating unit appears while continuously varying a manipulation object value in one direction will be explained. As a more specific example for the purpose of explanation, a case will be explained in which a manipulation object value varies in response to an amount of turning from a certain reference state, such as a vehicle steering wheel.

A case will be explained in which a manipulation object value corresponds to a turning angle of the manipulating unit, for example, a case in which the manipulation object value is 10 when the manipulating unit turns 10 degrees, and a state where the manipulating unit turns one rotation, i.e., 360 degrees, is the same. The state of the manipulating unit is turned 10 degrees rather than 370 degrees when varying it from zero degrees to 370 degrees. Similarly, the state of the manipulating unit is turned −10 degrees rather than 350 degrees when varying it from zero degrees to 350 degrees. At that time, the varying direction of the manipulating unit may be restricted. For example, when variation is enabled only in the direction from the current state of the manipulating unit to a target state, the amount of variation of the manipulating unit is smaller by turning it +80 degrees in order to vary the state of the manipulating unit from +10 degrees to −270 degrees because the manipulating unit is turned in the negative direction; however, the manipulating unit is turned −280 degrees because the state of the manipulating unit is enable to vary only in the negative direction. Any restriction may be set other than the one illustrated above.

Also, the aforementioned partial omission of variation means that the manipulating unit needs to be turned only one rotation plus a degrees instead of turning three rotations plus a degrees, i.e., 1080+a degrees, for example.

The above example is an example of treating the state of the manipulating unit in the same fashion after turning 360 degrees. For example, the state of the manipulating unit may be treated in the same fashion after turning it 90 degrees if the shape of the manipulating unit is square, whereby the state of the manipulating unit may be controlled so that the amount of variation thereof becomes minimal or the process of variation is partially omitted. What types of states should be deemed the same state may be determined arbitrarily.

The manipulating unit can be thereby changed to a target state more rapidly; therefore, the time required for switching over the aforementioned controlled states can be reduced.

An example of application to a steer-by-wire system will be explained.

Figure 19:
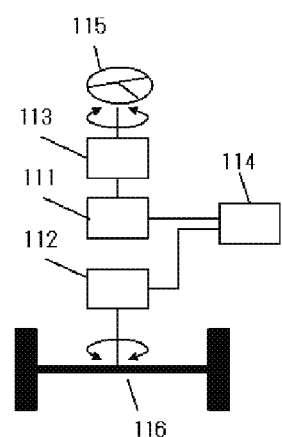
FIG. 19 an explanatory drawing of a general steer-by-wire system.

A steer-by-wire system as shown in FIG. 19 generally comprises actuators 1 (111) and 2 (112) for respectively manipulating a steering wheel (115) and a steering gear (116). One example of an actuator is a motor. The steering wheel (115) and the steering gear (116) are mechanically separated in a steer-by-wire system so that the actuator 1 (111) can turn the steering wheel (115) without depending on the steering gear (116) or change the angle of the steering gear (116) without turning the steering wheel (115). Here, the actuator 2 (112) for manipulating the steering gear (116) may be deemed to correspond to a second manipulating unit (2). Further, the steering wheel (115) is provided with a means, such as a torque sensor (113), for detecting turning of the steering wheel (115) or a load applied to the steering wheel (115) by the operator turning the steering wheel (115). The actuators 1 (111) and 2 (112) are controlled by a controller (114).

In the non-interlocked state, the steering wheel (115) is actuated by the actuator 1 (111) which manipulates the steering wheel. Further, the actuator 1 (111) can exert a load against turning of the steering wheel by the operator.

In the non-interlocked state, the steering gear (116) is manipulated by the actuator 2 (112). The steer-by-wire system is capable of actuating the steering wheel and steering gear sections independently because they are mechanically separated; therefore, the manipulating unit (1) can be actuated in the non-interlocked state of the manipulating apparatus according to the present application.

Further, a load applied to the manipulating unit, such as a steering wheel, can be detected using the aforementioned torque sensor or the like in order to execute the operations illustrated in FIG. 10.

Other types of input devices, such as a lever or a joystick may be implemented in a similar mode, that is, as long as at least a means for actuating the manipulating unit (1), a means for detecting a state of the manipulating unit, and a means for detecting manipulating the manipulating unit (1) by the operator are provided.

The above controls can be implemented by means of generic computers or a combination of circuits.

EXPLANATION OF REFERENCE NUMERALS 1 is a manipulating unit; 2 is a second manipulating unit; 3 is a manipulation object value; 4 is a means for manipulating the second manipulating unit; 11 is a target state; 12 is an instantaneous target state; 13 is the difference between the target state and a state of the manipulating unit; 14 is a state of the manipulating unit; 20 is a reference; 21 is a state of the manipulating unit; 22 is a second manipulating unit; 23 is a manipulation object value; 51 is a sensory indicative range 1; 52 is a sensory indicative range 2; 80 is a steering wheel; 81 is a reference amount of steering; 82 is an amount of steering; 101 is a first manipulating means; 102 is a target state; 111 is an actuator 1; 112 is an actuator 2; 113 is a sensor; 114 is a controller; 115 is a steering wheel; and 116 is a steering gear.

What is claimed is:
1. A manipulating apparatus for manipulating a manipulation object value, comprising a manipulating unit and a second manipulating unit,
the manipulating apparatus having an interlocked state and a non-interlocked state as controlled states, wherein
said interlocked state is a state in which said manipulation object value is determined in response to both or either of a state and movement of said manipulating unit, or
a state in which a normal manipulation is being performed by said manipulating unit;
said non-interlocked state is a state in which said manipulation object value is determined by said second manipulating unit, and
a state of said manipulating unit is determined in response to said manipulation object value;
a correspondence between said manipulation object value and a state of said manipulating unit is estab- lished, and said manipulating unit moves in response to said correspondence in said non-interlocked state; and said correspondence includes a section where variation of a ratio of variation of a state of said manipulating unit is continuous with respect to variation of said manipulation object value.

2. A manipulating apparatus for manipulating a manipulation object value, comprising a manipulating unit, the manipulating apparatus having at least two controlled states in which the movement between a state of said manipulating unit and said manipulation object value is controlled, wherein the state of the manipulating unit shifts so as to be in a state determined by a manipulating object value of a switchover destination when said controlled states are switched over;

at that time, the manipulating unit moves to be in a state determined by said manipulation object value when a load applied to the manipulating unit by manipulation of the manipulating unit is at or less than a maximum load; and said manipulation object value varies toward a value determined by a state of said manipulating unit when the load applied to the manipulating unit by manipulation of the manipulating unit is at or greater than the maximum load.

3. A manipulating apparatus for manipulating a manipulation object value, comprising a manipulating unit, the manipulating apparatus having at least two controlled states in which the movement between a state of said manipulating unit and said manipulation object value is controlled, wherein in a case where a state of the manipulating unit is not in a state corresponding to a manipulation object value in said controlled state of a switchover destination, correction is made to the behavior between said manipulating unit and a manipulation object value in said controlled state of the switchover destination so that said manipulation object value in said controlled state of the switchover destination becomes the current value according to the current state of the manipulating unit.

4. A manipulating apparatus having a controlled state 1 for manipulating a manipulation object value in response to a manipulating unit, the manipulating apparatus further having at least one controlled state 2 in which said manipulation object value is manipulated in response to a second manipulating unit, wherein in said controlled state 2, said manipulating apparatus is configured to perform a predetermined intervention in a manipulation by said second manipulating unit in response to a predetermined manipulation by said manipulating unit.

5. The manipulating apparatus according to claim 2, wherein the state of said manipulating unit is controlled such that the variation thereof is minimized, or the process of the variation is partially omitted when the state of said manipulating unit is changed to a state corresponding to said manipulation object value during a switchover between said controlled states.

* * * * *